United States Patent [19]

Lehto et al.

[11] Patent Number: 4,577,997
[45] Date of Patent: Mar. 25, 1986

[54] IRRIGATION PIPE

[76] Inventors: Eino Lehto, Linnankatu 53 F 224, 20100 Turku 10, Finland; Göran Möller, Enrisvägen 16, 14144 Huddinge, Sweden; Lasse Sjövall, Hämeenkatu 5 A 10, 20500 Turku 50, Finland

[21] Appl. No.: 511,793

[22] Filed: Jul. 7, 1983

[30] Foreign Application Priority Data

Jul. 7, 1982 [FI] Finland .................................. 822376

[51] Int. Cl.⁴ ............................................... E02B 3/00
[52] U.S. Cl. ......................................... 405/43; 405/36
[58] Field of Search ................. 405/43, 61, 36, 52, 405/45

[56] References Cited

U.S. PATENT DOCUMENTS

| 2,763,991 | 9/1956 | Kennon | 405/43 |
| 3,293,861 | 12/1966 | Hinde | 405/61 |
| 3,422,626 | 1/1969 | Hanrahan | 405/43 |
| 3,698,193 | 10/1972 | Daymond | 405/61 |
| 4,095,750 | 6/1978 | Gilead | 405/43 X |
| 4,117,685 | 10/1978 | Skaife | 405/36 |

Primary Examiner—Dennis L. Taylor
Attorney, Agent, or Firm—Karl F. Ross; Herbert Dubno

[57] ABSTRACT

An irrigation pipe, primarily for subterranean irrigation, said pipe having incisions in the longitudinal direction of the pipe, which incisions will open under the action of the pressure enabling the irrigation water to flow into the surrounding ground. It is characteristic of the pipe that a pipe made of two-layer material is used, the outer part of which is thinner than the inner part and the inner part has been cooled down during the manufacturing before the outer layer has been made, by which method the characteristic can be obtained that the incision opens more on the outside than on the inside thus preventing impurities of any kind from accumulating in the incision.

2 Claims, 3 Drawing Figures

IRRIGATION PIPE

FIELD OF THE INVENTION

Our present invention relates to irrigation pipe and, more particularly, to irrigation pipe of the type in which a slit for discharging the irrigating water opens as a result of pressure from the water. The invention is especially intended for subsurface irrigation pipe, i.e. irrigation pipe which lies in or is buried in the ground to deliver water to a crop planted therein.

BACKGROUND OF THE INVENTION

Irrigation is generally performed by means of uncovered ditches or by spraying water into the air, in which case the ground becomes wet on the surface. In warm weather the evaporation is high, which leads to a great loss of water. In hot climate and in areas where there is a shortage of water this method can not be applied and the ground dries up. If the water could be led directly to the roots below the ground in the growing depth of the plants, the need of water could be minimized. This has been attempted by using a perforated pipe but when an ordinary perforated pipe is used there is a leakage in direct proportion to the length of the pipe thus restricting the use of this method. In addition, the open perforation are clogged easily.

A buried irrigation pipe is also used, said pipe having through incisions in the longitudinal direction of the pipe so that with low pressure the incisions will stay closed in which case the pipe can also be used for moving the water. When the pressure increases, the incisions will open letting the water flow through the incision into the surrounding ground thus irrigating it. The pipe functions particularly well when it is new and when the water is absolutely pure but when the pipe deteriorates and the accumulation of impurities from the water in the pipe can not be avoided, malfunctions in the closing of the incisions also appear. It is characteristic of the incision in the pipe that when the pressure increases and the incision opens, it will become larger on the inside and more closed on the outside. From this follows that the impurities will be wedged into the incision, in which case at first sporadic dirt will restrain the incision from closing and finally, when a certain amount of dirt has been accumulated, the incision will clog and the pipe will become useless.

OBJECTS OF THE INVENTION

The principal object of the present invention is to overcome the above-described disadvantages.

Another object of this invention is to provide an irrigation pipe which can be used for subsurface irrigation purposes and which has a reduced tendency to clog with time.

Yet another object of this invention is to decrease the sensitivity of an irrigation pipe and hence an irrigation system to contaminants which may be contained in the irrigating water.

According to the present invention the disadvantage described above is eliminated, said invention being characterized in that the pipe in which the incisions are made is of two-layer material, the outer layer of the pipe being thinner than the inner layer and being manufactured so that the first layer is cooled down before the second layer is made.

By using the two-layer pipe in accordance with the invention the characteristic can be obtained in that the incision made in the longitudinal direction of the pipe will open under the pressure more on the outside than on the inside, in which case the incision will become larger on the outside and the impurities in the water will not wedge into the incision.

The invention is based upon our discovery that, when the irrigating pipe is eliminated from two layers of, for example, polyethylene or some other yieldable material, preferably a material having some elastomeric qualities and which can be reinforced if desired with nylon or other filaments, the outer layer being thinner than the inner layer and the first formed layer is cooled before the second layer is applied, the slits which traverse these layers develop an outwardly open V-configuration, i.e. tend to widen outwardly, so that contaminants within the pipe and entrained by the irrigating water do not tend to wedge into these slits when the slits open under the pressure of water in the pipe. Furthermore, even though material from the exterior may tend to collect within these outwardly widening slits as the pressure is reduced when renewed pressure is applied, such contaminants can be readily flushed away.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
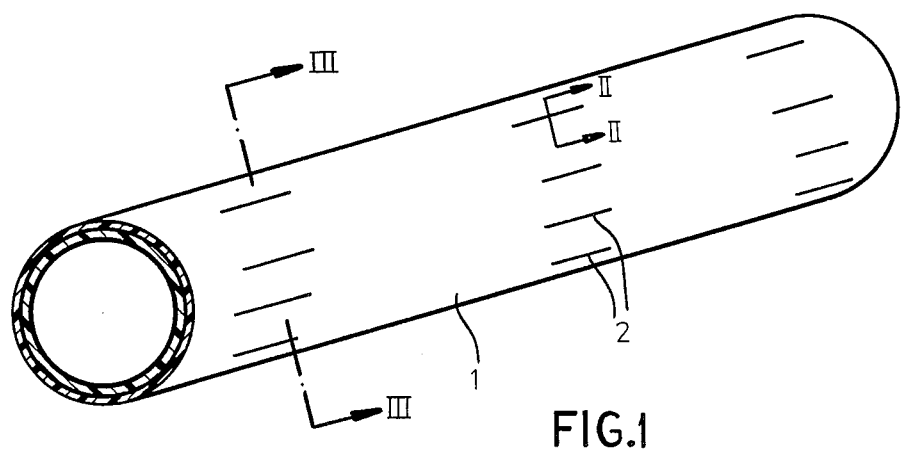
FIG. 1 is a diagrammatic perspective view of a section of an irrigation pipe embodying the invention.

From FIG. 1 it will be apparent that an irrigation pipe 1, according to the invention, can be formed at axially spaced locations with annular rows of slits or incisions 2 which are normally closed when the pipe is not under pressure but which can be sprayed to open when irrigating water is fed under pressure into the pipe. The latter can be laid upon the ground along a row of crop material or along a row of trees in an orchard or can be buried slightly below the ground surface to effect surface irrigation without wetting the surface significantly, thereby reducing evaporation losses.

Figure 2:
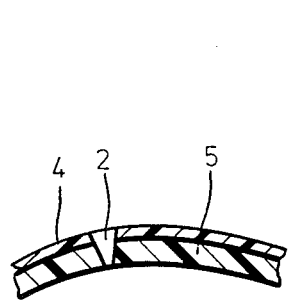
FIG. 2 is an enlarged cross-sectional view of the region II—II of FIG. 1.
Figure 3:
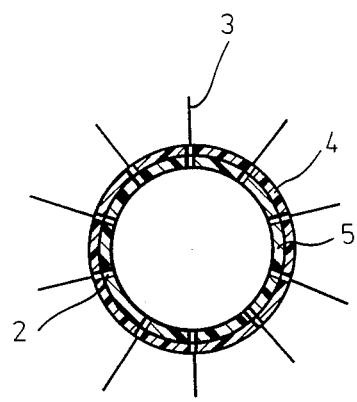
FIG. 3 is a section taken along the line III—III of FIG. 1 drawn to approximately the same scale as this figure.

As can be seen from FIGS. 2 and 3, the pipe is made up of two hot formed (e.g. extruded layers 4 and 5 of material, e.g. polyethylene, the inner one of which may be formed first and covered with the outer layer. What is important for the purposes of the invention is that whichever layer is formed first, it is cooled before the second layer is applied so that a blending of the two layers is prevented.

The outer layer 4 should always be thinner than the inner layer 5 and preferably the inner layer 5 is two or more times greater in thickness than the outer layer.

When the throughgoing incisions are thereafter made, it is found that they will tend to widen outwardly as is shown clearly in FIG. 2 as the water pressure within the pipe builds up to discharge the irrigating jets 2.

We claim:

1. A method of irrigation which comprises the steps of:

forming a two-layer irrigating pipe by
  producing a hot tubular first layer of polyethylene plastic,
  allowing said first layer to cool,
  then applying a second layer of polyethylene plastic so that it completely ensheathes said first layer in continuous contact with said first layer uniformly all around the periphery thereof and with a thickness less than that of said first layer but such that material of said second layer does not blend with material of the first layer, and
  incising through both said layers with parallel incisions extending longitudinally of the pipe and uniformly spaced apart all around the circumference of the both layers and spaced apart along the length of the resulting pipe;
burying said pipe in a region irrigated; and
passing irrigating water under pressure through said pipe, thereby widening said incision outwardly and permitting water to flow outwardly through the outwardly widened incisions.

2. The method defined in claim 1 wherein said incisions are provided to enable spaced annular rows along said tube.

* * * * *